United States Patent
Zheng et al.

(10) Patent No.: US 8,675,943 B2
(45) Date of Patent: Mar. 18, 2014

(54) METHOD AND SYSTEM FOR HEART ISOLATION IN CARDIAC COMPUTED TOMOGRAPHY VOLUMES FOR PATIENTS WITH CORONARY ARTERY BYPASSES

(75) Inventors: Yefeng Zheng, Dayton, NJ (US); Fernando Vega-Higuera, Erlangen (DE); Dorin Comaniciu, Princeton Junction, NJ (US)

(73) Assignee: Siemens Aktiengesellschaft, München (DE)

( * ) Notice: Subject to any disclaimer, the term of this patent is extended or adjusted under 35 U.S.C. 154(b) by 211 days.

(21) Appl. No.: 13/295,217

(22) Filed: Nov. 14, 2011

(65) Prior Publication Data

US 2012/0134564 A1 May 31, 2012

Related U.S. Application Data

(60) Provisional application No. 61/417,602, filed on Nov. 29, 2010.

(51) Int. Cl.
*G06K 9/00* (2006.01)
(52) U.S. Cl.
USPC .......................................................... 382/131
(58) Field of Classification Search
None
See application file for complete search history.

(56) References Cited

U.S. PATENT DOCUMENTS

| | | |
|---|---|---|
| 7,634,123 B2 | 12/2009 | Florin et al. |
| 7,916,919 B2 | 3/2011 | Zheng et al. |
| 2010/0239148 A1 | 9/2010 | Zheng et al. |

OTHER PUBLICATIONS

Zheng, Yefeng, et al. "Automatic aorta segmentation and valve landmark detection in C-arm CT: application to aortic valve implantation." Medical Image Computing and Computer-Assisted Intervention—MICCAI 2010. Springer Berlin Heidelberg, 2010. 476-483.*
Achenbach, M. D., et al. "Noninvasive, three-dimensional visualization of coronary artery bypass grafts by electron beam tomography." The American journal of cardiology 79.7 (1997): 856-861.*
Yefeng Zheng; Barbu, A.; Georgescu, B.; Scheuering, M.; Comaniciu, D., "Four-Chamber Heart Modeling and Automatic Segmentation for 3-D Cardiac CT Volumes Using Marginal Space Learning and Steerable Features," Medical Imaging, IEEE Transactions on, vol. 27, No. 11, pp. 1668,1681, Nov. 2008.*
Y. Zheng, et al., "Fast and Automatic Heart Isolation in 3D CT Volumes: Optimal Shape Initialization", In Proc. Int'l Workshop on Machine Learning in Medical Imaging (in Conjunction with MICCAI), 2010.

* cited by examiner

*Primary Examiner* — Nirav G Patel
(74) *Attorney, Agent, or Firm* — Michele L. Conover

(57) ABSTRACT

A method and system for isolating the heart in a 3D volume, such as a cardiac CT volume, for patients with coronary artery bypasses is disclosed. An initial heart isolation mask is extracted from a 3D volume, such as a cardiac CT volume. The aortic root and ascending aorta are segmented in the 3D volume, resulting in an aorta mesh. The aorta mesh is expanded to include bypass coronary arteries. An expanded heart isolation mask is generated by combining the initial heart isolation mask with an expanded aorta mask defined by the expanded aorta mesh.

36 Claims, 15 Drawing Sheets

(a) (b)

(a)

(b)

(c)

(d)

(a)

(b)

(c)

(d)

(a)

(b)

(c)

(d)

(a)   (b)

US 8,675,943 B2

METHOD AND SYSTEM FOR HEART ISOLATION IN CARDIAC COMPUTED TOMOGRAPHY VOLUMES FOR PATIENTS WITH CORONARY ARTERY BYPASSES

This application claims the benefit of U.S. Provisional Application No. 61/417,602, filed Nov. 29, 2011, the disclosure of which is herein incorporated by reference.

BACKGROUND OF THE INVENTION

The present invention relates to isolating the heart in medical image data, and more particularly, to isolating the heart in medical imaging data for patients with coronary artery bypasses.

Heart isolation refers separating the heart in medical image data from other tissues in close proximity to the heart, such as the lungs, liver, and rib cage. Most previous work relating heart segmentation focuses on segmenting heart chambers, especially the left ventricle. Segmenting the heart as a whole, or heart isolation, has relevance to several applications. For example, after separating the heart from the proximity tissues (e.g., lung, liver, and rib cage) in a 3D computed tomography (CT) volume, the coronary arteries can be clearly visualized in 3D. According to statistics from the United States Center for Disease Control and Prevention, cardiovascular disease (CVD) is the leading cause of death in the United States. Coronary artery disease (CAD) is among the most common types of CVD. A 3D visualization of the coronary artery tree provides an intuitive view for cardiologists to easily diagnose suspicious coronary segments. In addition, the same cardiac CT data can be used to generate angiographic-like images that can replace conventional angiograms in many cases. In both applications, the segmented heart mask should not cut the coronary arteries, which run on the surface of the heart. This provides a significant challenge to heart segmentation algorithms.

BRIEF SUMMARY OF THE INVENTION

The present invention provides a method and system for automatically isolating the heart in 3D medical image data, such as cardiac CT volumes. Embodiments of the present invention automatically generate a heart isolation mask that effectively isolates the heart in cardiac CT volumes for patients with coronary artery bypasses.

In one embodiment of the present invention, an initial heart isolation mask is extracted from a 3D volume. An aortic root and an ascending aorta are segmented in the 3D volume, resulting in an aorta mesh. The aorta mesh is expanded to include bypass coronary arteries. An expanded heart isolation mask is generated by combining the initial heart isolation mask with an expanded aorta mask defined by the expanded aorta mesh.

These and other advantages of the invention will be apparent to those of ordinary skill in the art by reference to the following detailed description and the accompanying drawings.

DETAILED DESCRIPTION

The present invention is directed to a method and system for heart isolation in 3D medical images, such as 3D cardiac CT volumes. Embodiments of the present invention are described herein to give a visual understanding of the heart isolation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Figure 1:
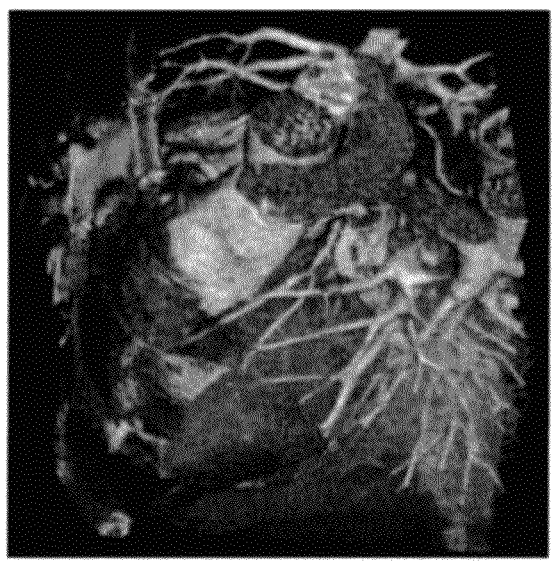
FIG. 1 illustrates the use of heart isolation for 3D visualization of the coronary arteries.
Figure 1:
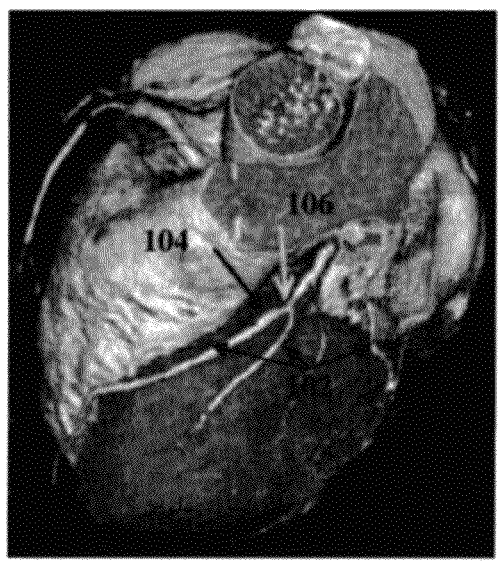

Heart Isolation is highly relevant to several applications. For example, after separating the heart from tissues in proximity to the heart (e.g., lung, liver, and rib cage), the coronary arteries can be clearly visualized in 3D. FIG. 1 illustrates the use of heart isolation for 3D visualization of the coronary arteries. As illustrated in FIG. 1, image (a) shows a 3D visualization of the heart before heart isolation and image (b) shows a 3D visualization of the heart after heart isolation. As shown in image (b) the coronary arteries 102 are clearly visualized after the heart isolation. This 3D visualization of the coronary artery tree 102 provides an intuitive view for cardiologists to easily diagnose suspicious coronary segments. For example, in image (b) suspicious regions including a calcified plaque 104 and a soft plaque 106 can be diagnosed on the 3D visualization of the coronary arteries 102.

Heart isolation is a difficult problem due to the following challenges. 1) The boundary between some of the neighboring tissues (e.g., liver and diaphragm) is quite weak in a CT volume. 2) The heart is connected to other organs by several major vessel trunks (e.g., aorta, vena cavas, pulmonary veins, and pulmonary arteries). The segmented heart mask must cut those major vessel trunks somewhere (typically at the position where the vessels connect to the heart), although there is no boundary there. 3) The deformation of the whole heart in a heart cycle is more complicated than that of each individual chamber. 4) Many CT scans have part of the heart missing in the captured volume, especially at the top and bottom of the heart, which introduces an extra shape variation.

The present inventors have developed an efficient and fully automatic approach for heart isolation in cardiac CT volumes. First marginal space learning (MSL) is utilized to efficiently estimate the position, orientation, and scale of the heart in a CT volume. A trained mean shape is aligned with the estimated pose as an initialization of the heart shape. Learning based boundary detectors are then used to guide boundary evolution. Since the background surrounding the heart is different from chamber to chamber, the whole heart surface is split into four patches with each patch corresponding to a chamber of the heart. A separate boundary detector is trained for each patch. The use of a separate trained boundary detector for each patch is more accurate than using a single boundary detector for the whole heart surface. For the application to coronary artery visualization, bright tissues surrounding the heart surface, such as the descending aorta filled with contrast agent and the rib cage, should be completely removed. Otherwise, such bright tissues will block the coronary arteries in the 3D visualization. Post-processing is utilized to exclude those extra tissues. A binary mask volume is then generated, where voxels inside the heart are set to 1 and all other voxels are set to 0. This method is more robust than previous heart isolation methods and works for both contrasted and non-contrasted CT scans. This method typically takes about 1.5 seconds to process one volume, which is faster than previous methods by at least one order of magnitude. This method for heart isolation works well on most CT datasets, except for patients with bypass coronary arteries.

When a stenosis is too severe and medical therapy does not help, a surgical intervention is typically required. Coronary artery bypass surgery is a well established procedure to improve the blood supply to the myocardium through coronary circulation. An artery or vein from elsewhere in the patient's body is typically harvested and grafted to the coronary arteries to bypass the stenosis. Typically, one end of the graft is sewn onto a coronary artery beyond the blockage and the other end is attached to the ascending aorta. Alternatively, the distal end of the left/right internal thoracic artery (LITA/RITA) can be attached to the stenotic coronary artery with its proximal end keeping connected to the subclavian artery.

Figure 2:
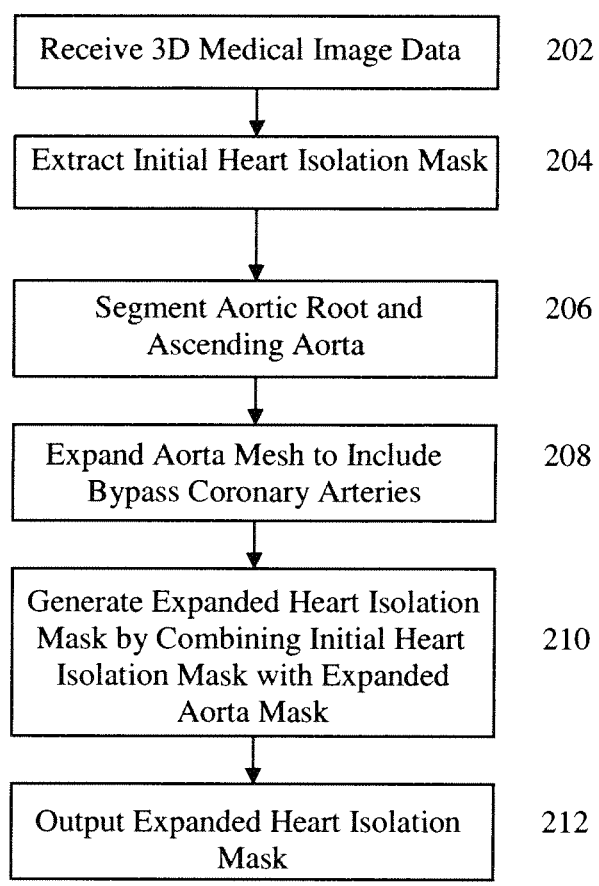
FIG. 2 illustrates a method for isolating the heart in a 3D medical image according to an embodiment of the present invention.

The native coronary arteries originate from the left or right coronary ostium on the aortic valve and wind on the pericardium of the ventricles (the left ventricle and right ventricle). Since the coronary arteries are mostly at the lower part of the heart, the heart isolation algorithm described above removes most tissues above the aortic valve, ideally only preserving the left and right atria. However, the bypass coronaries may be grafted on the ascending aorta surface above the aortic valve (FIG. 2). In this case, a part of the bypass coronary may be cut by the heart mask. For the LITA/RITA bypass, the proximal part of the bypass artery is attached to the subclavian artery well above the aortic arch. Normally, the LITA/RITA ostium is not captured in the volume in a standard cardiac CT protocol. Otherwise, the axial scan range needs to be significantly enlarged, thus increasing the radiation dose of a CT scan. For the LITA/RITA bypass patients, advantageous embodiments of the present invention extend the heart isolation mask towards the top volume border to preserve the bypass coronaries. It is not trivial to modify the above described model-based heart isolation algorithm. In that approach, after detecting the heart pose, a mean shape of the heart is aligned with respect to the heart pose as an initialization of the heart segmentation. However, the field-of-view significantly varies for cardiac CT volumes. Some volumes are cut at the top of the atria, while others may be significantly extended to the aortic arch. It is impossible to use one mean shape to represent the whole shape population under such dramatic variations.

Embodiments of the present invention explicitly segment the aortic root and the ascending aorta. In order to handle variations in the field of view, a part based aorta model can be used to segmented the aortic root and the ascending aorta. After aorta segmentation, the segmented aorta mesh can be progressively grown until it touches the heart-lung boundary. The region inside the extended mesh is added to the heart mask, thus successively preserving the bypass coronary arteries.

FIG. 2 illustrates a method for isolating the heart in a 3D medical image according to an embodiment of the present invention. In particular, the method of FIG. 2 provides a method for isolating the heart in 3D medical images for patients with coronary artery bypasses. The method of FIG. 2 isolates the heart while preserving the bypass coronary arteries in the heart isolation mask.

As illustrated in FIG. 2, at step 202, 3D medical image data (a 3D volume) is received. For example, in an advantageous embodiment, the 3D medical image data can be a cardiac CT volume. However, the present invention is not limited thereto and may be applied to other types of 3D medical image data, such as a 3D MRI volume, as well. The 3D medical image data may be received from an image acquisition device, such as a CT scanner. The 3D medical image data may also be received by loading 3D medical image data previously stored, for example, in a memory or storage of a computer system.

Figure 3:
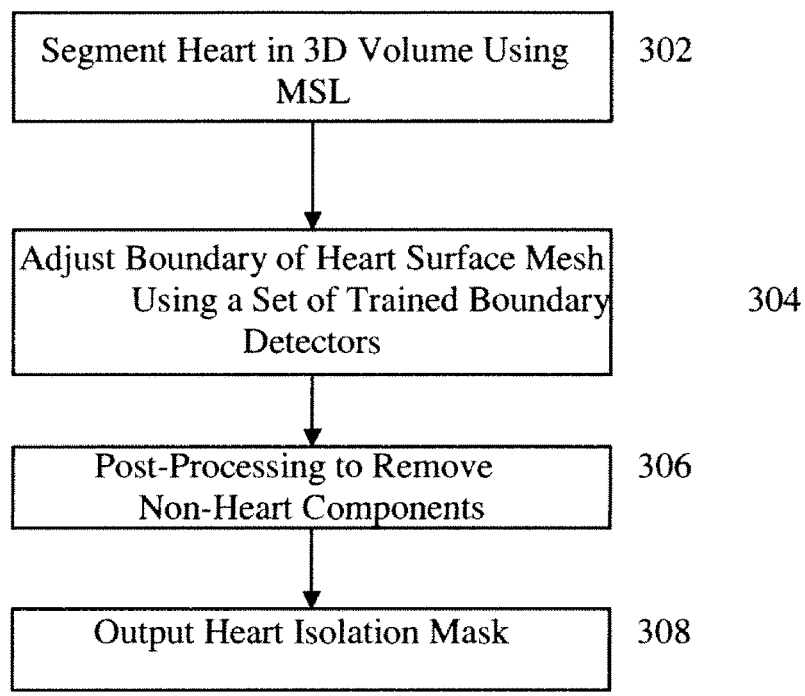
FIG. 3 illustrates a method of extracting an initial heart isolation mask from 3D medical image data according to an embodiment of the present invention.

At step 204, an initial heart isolation mask is extracted from the 3D medical image data. The initial heart isolation mask can be extracted by segmenting a heart mesh in the 3D medical image data using marginal space learning, then refining the boundaries of the segmented heart mesh by dividing the heart mesh into patches and using separate trained boundary detectors for each patch. FIG. 3 illustrates a method of extracting an initial heart isolation mask from 3D medical image data according to an embodiment of the present invention. The method of FIG. 3 can be used to implement step 204 of FIG. 2.

Referring the FIG. 3, at step 302, a heart mesh is segmented using marginal space learning (MSL). MSL is used estimate the position, orientation, and scale of the heart in the 3D volume using a series of detectors trained using annotated training data. MSL has recently been developed to apply learning based techniques for 3D object detection. For example, a method for MSL-based heart chamber segmentation is described in detail in U.S. Pat. No. 7,916,919, issued Mar. 29, 2011, and entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. The 3D object detection is split into three steps: object position estimation, position-orientation estimation, and position-orientation-scale estimation. A separate classifier is trained based on annotated training data for each of these steps. This object localization stage results in an estimated transformation (position, orientation, and scale) of the object, and a mean shape of the object (i.e., the mean shape of a whole heart surface model in the annotated training images) is aligned with the 3D volume using the estimated transformation. This results in an initial estimate of the heart surface boundary.

At step 304, the heart surface boundary is adjusted using a set of trained boundary detectors. Active shape models (ASM) can be used to deform an initial estimate of a non-rigid shape under the guidance of the image evidence and a shape prior. The non-learning based generic boundary detector in the traditional ASM is not robust under complex background or weak edges. A learning based method can be used to exploit more image evidence to achieve a robust boundary detection. However, it is difficult to train a single boundary detector for the whole heart surface since the background surrounding the heart is quite complicated and different from chamber to chamber. Such variation makes the learning problem challenging. Instead, according to an embodiment of the present invention, the whole heart surface model is split into four patches with one for each chamber and a separate boundary detector is trained for each patch. Such a divide-and-conquer strategy makes the trained boundary detector more robust. The multi-patch boundary detectors are then used to guide the boundary evolution.

Figure 4:
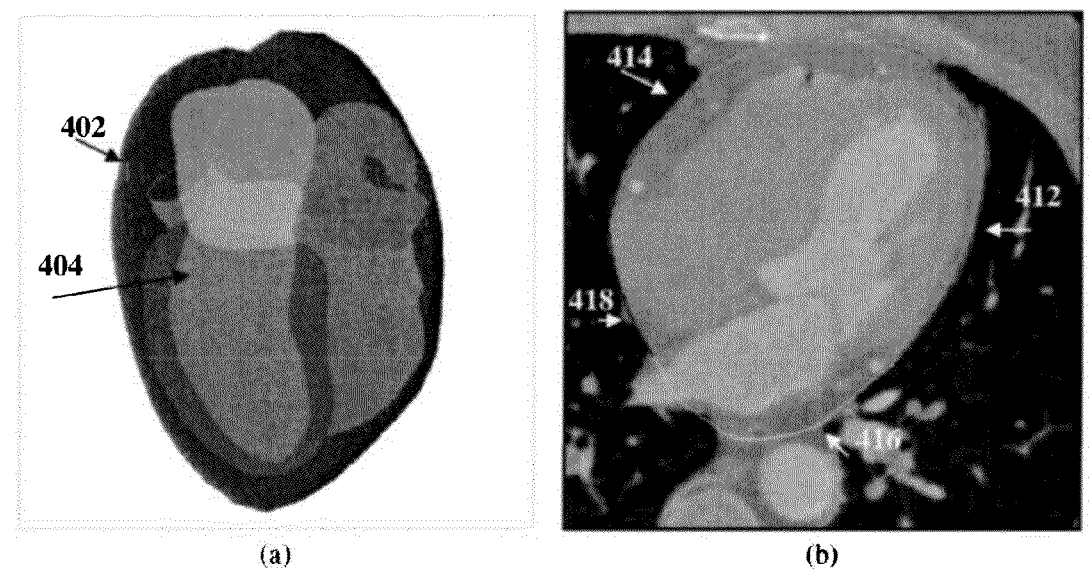
FIG. 4 illustrates splitting the whole heart surface mesh into four patches corresponding to the four chambers of the heart.

It is tedious to manually assign each mesh point (in one implementation, the whole heart surface mesh has 514 mesh points) to a patch. According to an embodiment of the present invention, an automatic method is used for mesh splitting. The method for four-chamber heart segmentation described in U.S. Pat. No. 7,916,919 is used to segment the heart chambers in the training volumes. For each mesh point on the heart surface, the minimal distance to each chamber is calculated and the point is assigned to the closest chamber. Such assignment is performed independently for each volume in the training set. The assignment of mesh points to chambers is typically quite consistent across training volumes, except for a few points on the boundary of neighboring chambers. Finally, the mesh points of the mean heart surface mesh are assigned to the chamber that is most likely to be the closest chamber in the whole training set. FIG. 4 illustrates splitting the whole heart surface mesh into four patches corresponding to the four chambers of the heart. As illustrated in FIG. 4, image (a) shows the whole heart surface mesh 402 together with the four-chamber model 404, and image (b) shows the patches 412, 414, 416, and 418 after splitting the whole heart surface mesh 402 on a 2D cross-section view. The patches 412, 414, 416, and 418 in image (b) correspond to the left ventricle, right ventricle, left atrium, and right atrium, respectively. Once the trained boundary detectors are used to deform the segmented heart surface mesh, the heart surface mesh can define a heart isolation mask.

Returning to FIG. 3, at step 306, post-processing is performed on the heart surface mesh to exclude extra components from the heart isolation mask. In most cases, good segmentation results can be achieved after the MSL based 3D object detection and the multi-patch boundary detector guided boundary delineation. However, in a few cases, a part of the descending aorta and/or the rib cage (sternum and ribs) may be included in the heart mask. Explicit post-processing can be used to completely exclude these extra components from the heart mask.

Figure 5:
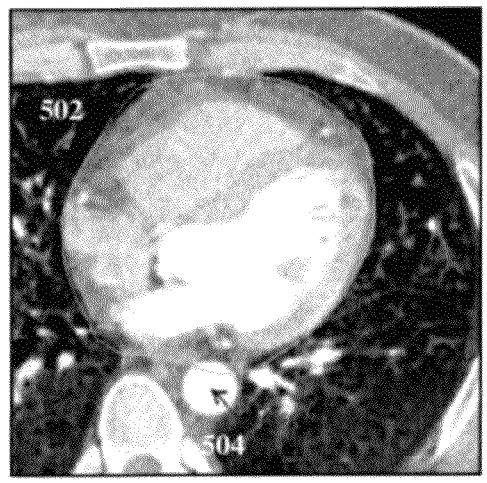
FIG. 5 illustrates post-processing to exclude the descending aorta from the heart mask.
Figure 5:
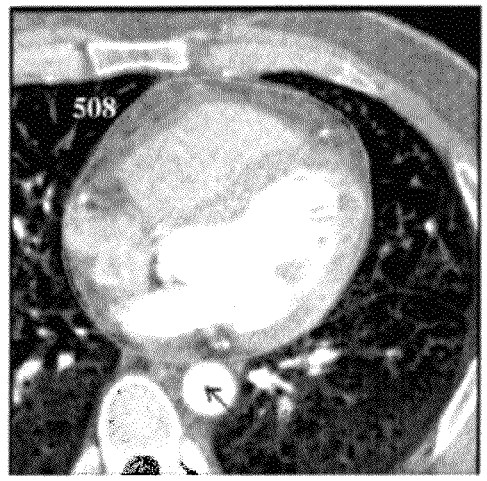
Figure 5:
Figure 5:

FIG. 5 illustrates post-processing to exclude the descending aorta from the heart mask. As illustrated in FIG. 5, image (a) shows a cross-section of a 3D cardiac CT volume before post-processing and image (c) shows a 3D visualization of the heart before post-processing. As shown in image (a) of FIG. 5, a part of the descending aorta 504 may be included in the heart mask 502. This happens when the initial mesh (after automatic object pose estimation) crosses the aorta in the middle. Since the mesh has to cut the heart in a region without image boundary, the boundary detector cannot be trained well. If the initial mesh is not good enough, the final segmentation may include a small piece of the descending aorta. Visualized in 3D, as shown in image (c) of FIG. 5, the descending aorta appears as an extra bright component 506 with the isolated heart. Explicit post-processing can be used to correct such mistake. Normally, the descending aorta is filled with contrast agent and has a high image intensity. For a mesh point in the neighborhood of the descending aorta, the intensity of the underlying voxel is tested. If the intensity is higher than Hounsfield Unit (HU) of 75, the mesh point is inside the descending aorta. From the annotated dataset, the indexes of the mesh points that are close to the descending aorta are known. During the automatic heart isolation process, it is not necessary to segment the descending aorta, which may be time consuming. Instead, the voxel intensity of each of the mesh points close to the descending aorta is checked to decide if the point is inside the descending aorta or not. If a point is inside the descending aorta, the point is pushed toward the heart center, until it is outside the bright region (with HU less than 75). Such post-processing is efficient, consuming negligible computation power. Image (b) shows a cross-section of a 3D cardiac CT volume after post-processing and image (d) shows a 3D visualization of the heart after post-processing. As shown in images (b) and (d), the descending aorta is completely excluded from the heart mask 508 and the corresponding 3D visualization after the post-processing.

Figure 6:
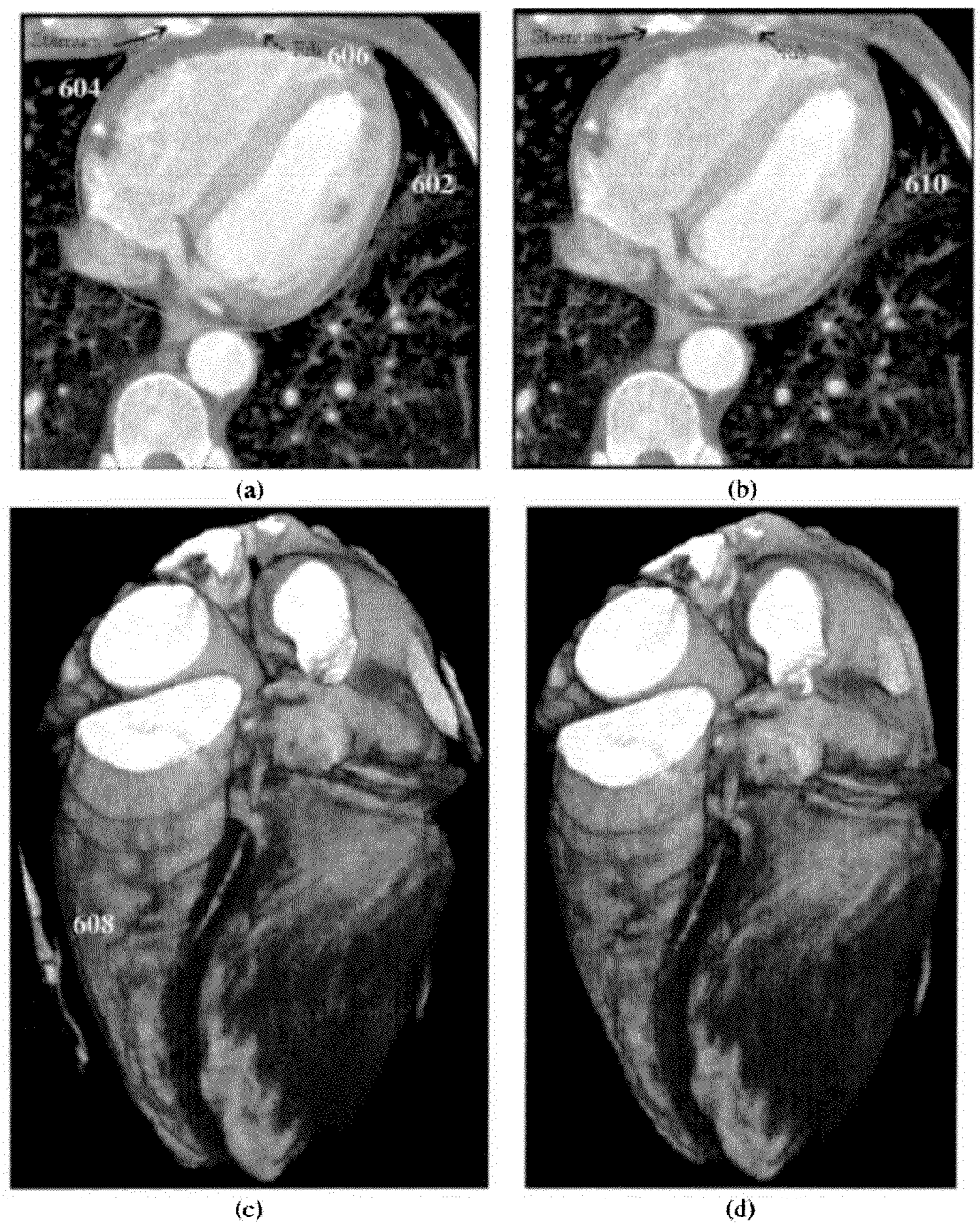
FIG. 6 illustrates post-processing to exclude the sternum and ribs from the heart mask.

FIG. 6 illustrates post-processing to exclude the sternum and ribs from the heart mask. As illustrated in FIG. 6, image (a) shows a cross-section of a 3D cardiac CT volume before post-processing and image (c) shows a 3D visualization of the heart before post-processing. Image (b) shows a cross-section of a 3D cardiac CT volume after post-processing and image (d) shows a 3D visualization of the heart after post-processing. Sometimes, a part of the rib cage (sternum and rib bones) may be included in the heart mask. As shown in image (a) of FIG. 6, parts of the sternum 604 and a rib 606 are inside the heart boundary 602 defining the heart mask. As shown in image (c), the sternum and ribs appear as extra components 608 in the 3D visualization. Generally, bones have a higher HU value than soft tissues. However, due to the use of contrast agent, the blood pool in a heart chamber may have a comparable or higher HU value than the bones. As shown image (a), the rib 606 included in the heart mask 602 has a comparable brightness to the right ventricle, but a lower intensity than the left ventricle. Therefore, a simple intensity test (as described above for the descending aorta) cannot determine if a mesh point lies on the bone structures.

Figure 7:
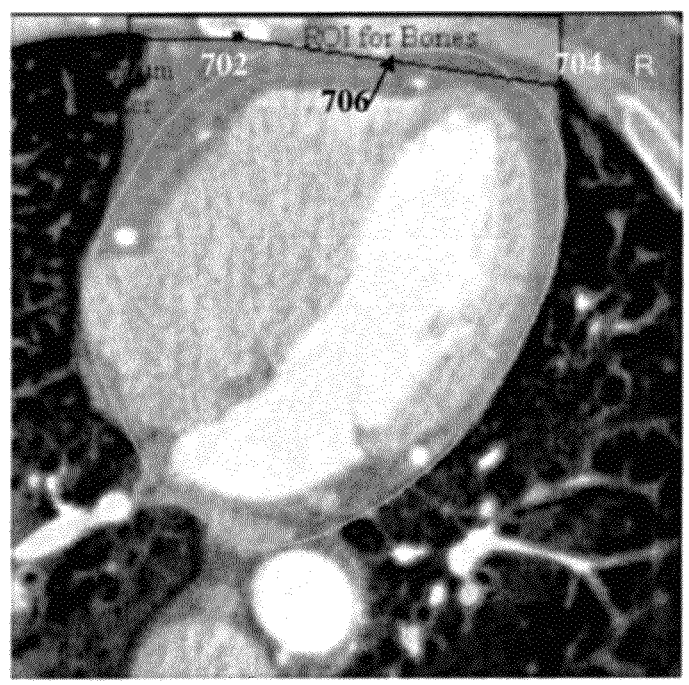
FIG. 7 illustrates a region of interest defined by the sternum center and the left lung cusp.
Figure 8:
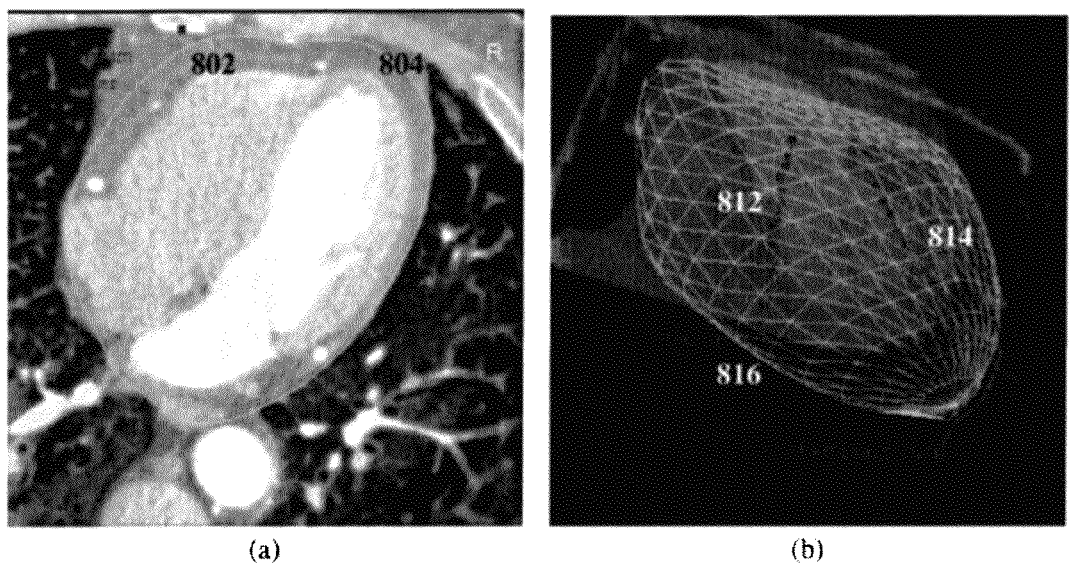
FIG. 8 illustrates automatic detection of the sternum center and the left lung cusp.

In order to exclude the sternum and ribs from the heart mask, these structures have to be explicitly segmented. Since the sternum and ribs are close to the volume border, the visible part varies significantly from case to case. Without a consistent structure in the captured volume, MSL cannot be used to detect these structures as a whole 3D object. Instead, two landmarks (the sternum center and the left lung cusp) are detected on each slice to determine a region of interest (ROI) on the slice. The heart does not lie on the center of the thoracic cage, but slightly toward the left part. The center of the sternum inner-border (the border close to the heart) and the left lung cusp are used to determine the ROI. FIG. 7 illustrates an ROI defined by the sternum center and the left lung cusp. As shown in FIG. 7, the line connecting the sternum center 702 and the left lung cusp 704 defines a border of the ROI 706. The sternum is extended horizontally toward the right lung by 20 mm to define another border of the ROI 706. The region behind these two borders define the RIO 706 for bone segmentation. A machine learning based technique is used to detect the landmarks on each slice. In particular, 2D Haar wavelet features and probabilistic boosting tree (PBT) are used to train two detectors, one for the sternum center and the other for the left lung cusp. The trained detectors are used to detect the sternum center and the left lung cusp on each slice of the 3D volume. FIG. 8 illustrates automatic detection of the sternum center and the left lung cusp. Image (a) of FIG. 8 shows the automatically detected sternum center 802 and left lung cusp 804 on a slice. Image (b) of FIG. 8 shows the contours of the sternum center 812 and the left lung cusp 814 formed by the detected landmarks on all slices, shown together with the heart surface mesh 816. After landmark detection, the ROI is extracted on each slice, as shown in FIG. 7. Stacking the ROIs on all slices results in a volume of interest (VOI). Typically, bones are brighter than the soft tissues in a CT volume, therefore, intensity thresholding can be used to remove soft tissues. However, due to the variations of CT scanners, patients, and scanning protocols, a predefined threshold does not work for all cases. An adaptive optimal threshold is automatically determined by analyzing the intensity histogram of all voxels in the VOI. For some cases, a part of a chamber may be included in the VOI, though this is rare. Three dimensional connected component analysis of the bright voxels can remove the residual chambers since the dark region composed by the myocardium separates the blood pool and the bones. After connected component analysis, only the largest component is preserved as the segmented sternum and ribs. The heart mesh is then adjusted to make sure the bones are completely excluded from the mask. As shown in images (b) and (d) of FIG. 6, the sternum and ribs are successfully excluded from the heart mask 610 and the corresponding 3D visualization after post-processing.

Returning to FIG. 3, at step 308, the heart isolation mask is output. The heart isolation mask is defined by the final boundary of the heart surface model in the 3D volume. The heart isolation mask can be generated by generating a binary mask volume, where voxels inside the heart surface boundary are set to 1 and all other voxels are set to 0.

Figure 9:
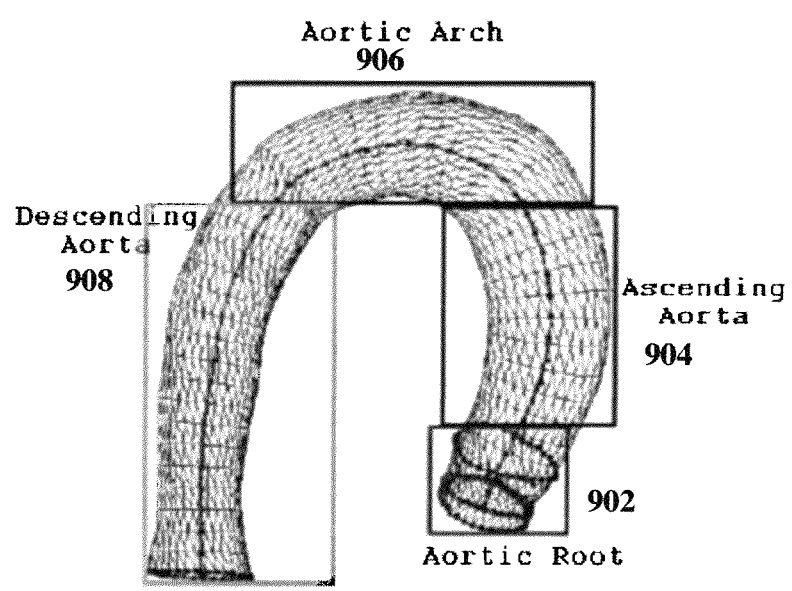
FIG. 9 illustrates a part-based aorta model.

Returning to FIG. 2, at step 206, the aortic root and ascending aorta are segmented in the 3D medical image. In order to handle variations in field of view a part-based aorta model can be used to segment the aortic root and the ascending aorta. FIG. 9 illustrates a part-based aorta model. As illustrated in FIG. 9 the part-based aorta model splits the aorta into four parts: aortic root 902, ascending aorta 904, aortic arch 906, and descending aorta 908. In this application, it is only necessary to segment the aortic root and the ascending aorta.

Figure 10:
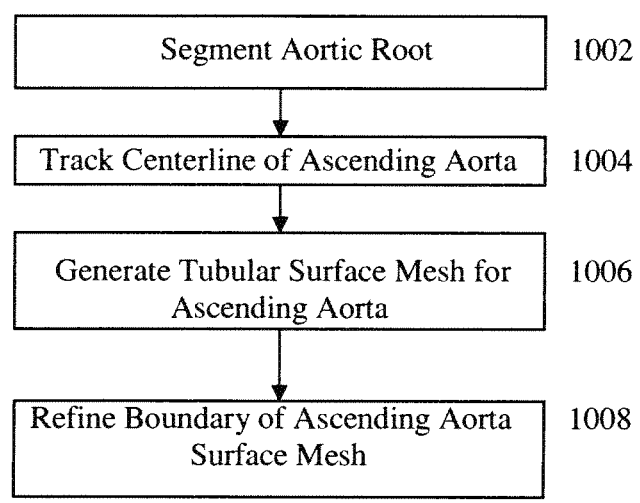
FIG. 10 illustrates a method for segmenting the aortic root and the ascending aorta according to an embodiment of the present invention.

FIG. 10 illustrates a method for segmenting the aortic root and the ascending aorta according to an embodiment of the present invention. The method of FIG. 10 can be used to implement step 206 of FIG. 2. The method of FIG. 10 is similar to the method for the aorta segmentation method described in United States Published Patent Application No. 2010/0239148, which is incorporated herein by reference. However, in the method of FIG. 10, it is not necessary to segment the entire aorta.

Referring to FIG. 10, at step 1002, the aortic root is detected in the 3D medical image data. The aortic root is detected using MSL. As described above in MSL-based segmentation, after estimating the pose (position, orientation, and scale) of an object, the mean shape of the object is aligned with the estimated pose as an initial estimate of the object shape. The aortic root is consistently present in cardiac CT volumes, and therefore can be segmented as a holistic object using MSL. Although the aortic root is consistently present in cardiac CT volumes, the length of the aortic root may vary significantly. Due to this structure variation, it is difficult to calculate a reliable mean shape for the aortic root in annotated training data. Accordingly, in order to train the MSL classifiers for detecting the aortic root, the shortest aortic root that is consistent in length across all of the training volumes is identified, and the aortic roots of the training volumes are truncated to match the shortest aortic root. After truncating the aortic roots of the training data, the aortic roots are consistent in anatomy and MSL can be applied to train classifiers to detect and segment the aortic root. In particular, the mean shape of the truncated aortic roots in the training data is aligned with the estimated pose determined using the MSL classifiers. After the initial estimate for the pose of the aortic root is detected, a learning based boundary model and active shape model can be used for final boundary delineation of the aortic root.

At step 1004, the centerline of the ascending aorta is tracked from the aortic root in the 3D volume. The length of the visible ascending aorta varies significantly from volume to volume. Instead of truncating them to the same length, a tracking method can be used to deal with this variation. In a CT volume, the orientation of the ascending and descending aorta (after excluding the root and the arch) aligns quite well with the normal of the imaging plane. This means that on an image slice, the intersection of the ascending aorta is in the approximate shape of a circle. According to an embodiment of the present invention, a 2D circle detector is trained based on annotated training data to detect the circular intersection of the ascending aorta with a 2D slice. According to an advantageous implementation, the 2D circle detector can be trained using Haar wavelet features. The tracking of the ascending aorta starts from the aortic root and is performed slice by slice, moving upwards towards a patient's head. For each slice, the trained circle detector is used to attempt to detect an aortic circle on that slice. For an imaging slice containing the ascending aorta, the 2D circle detector may fire up multiple times around the true position of the aortic circle. The detected circle that is closest to the circle detected on the previous slice is selected, and the tracking method moves to the next slice. It is to be understood that the initial circle on the initial slice corresponds to an uppermost portion of the aortic root. The ascending aorta is tracked upwards from the aortic root and the tracking procedure stops when it reaches the top border of the volume, when no aortic circle is detected in a slice, or when it reaches the aortic arch.

At step 1006, a tubular mesh is generated for the ascending aorta. The tracking step results in the centerline of the ascending aorta. A tube is synthesized as an initial estimate of the shape for the ascending aorta. The radius of the tube can be set as the mean radius of the aorta calculated from the training volumes.

At step 1008, the boundary of the ascending aorta mesh is refined. The initial estimate of the ascending aorta shape achieved from the tracking steps is close to the true aorta boundary; however, a perfect circle likely does not fit the boundary exactly. A learning based boundary detector is trained based on training data and used for final boundary delineation. A generic mesh smoothing technique can then be used to achieve a smooth surface for the segmented aorta. Accordingly, a two-step iterative approach can be used for boundary refinement. First, the learning-based boundary detector is used to adjust each mesh point along the surface normal to the optimal position where the response of the boundary detector is largest. Second, a mesh smoothing technique is used to smooth the resulting boundary. These two steps can be iterated to improve the boundary delineation accuracy.

Figure 11:
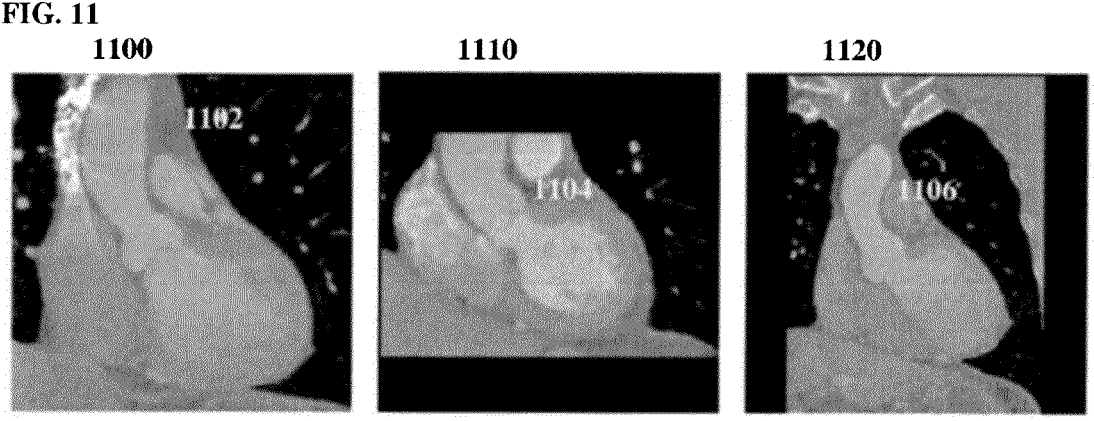
FIG. 11 illustrates exemplary aorta segmentation results.

FIG. 11 illustrates exemplary aorta segmentation results. As shown in FIG. 11, images 1100, 1110, and 1120 show aorta segmentation results 1102, 1112, and 1122, respectively, using the method of FIG. 10.

Returning to FIG. 2, at step 208, the aorta mesh is expanded to include the bypass coronary arteries. In particular, the aorta surface mesh generated in step 206 is extended outwards until the aorta surface mesh touches the heart-lung boundary or until a predetermined maximum dilation is reached. In a possible implementation, the maximum dilation can be 40 mm. It is easy to distinguish the lung from the heart in the CT volume. During expansion of the aorta mesh, if the intensity drops below a predetermined intensity threshold, it is determined that the mesh has reached the heart-lung boundary. For example, the intensity threshold may be −624 Hounsfield Unit (HU). Once the intensity of a mesh point drops below the intensity threshold, the expansion stops. The expansion also stops if the maximum dilation is reached.

At step 210, an expanded heart isolation mask is generated by combining the initial heart isolation mask with an expanded aorta mask defined by the expanded aorta mesh. The expanded aorta mask is generated by generating a binary mask volume, where voxels inside the expanded aorta mesh are set to 1 and all other voxels are set to 0. The expanded aorta mask is combined with the initial heart isolation mask extracted at step 204, resulting in an expanded heart isolation mask that includes bypass coronary arteries.

At step 212, the expanded heart isolation mask is output. For example, the expanded heart isolation mask may be output by displaying the expanded heart isolation mask on a display device of a computer system. The expanded output mask may also be saved in a memory or storage of a computer system. The expanded output mask may be used to generate a 3D visualization of the heart.

Figure 12A:
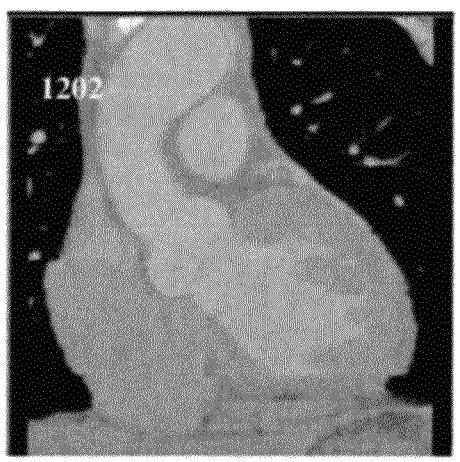
FIG. 12A illustrates exemplary heart isolation results for a bypass patient using the method of FIG. 2.
Figure 12A:
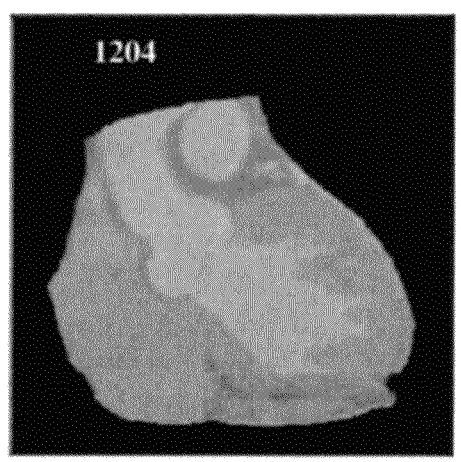
Figure 12A:
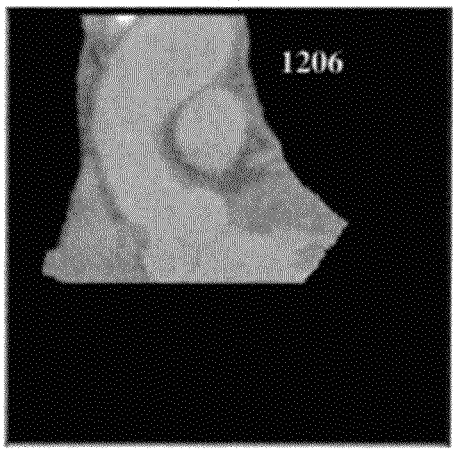
Figure 12A:
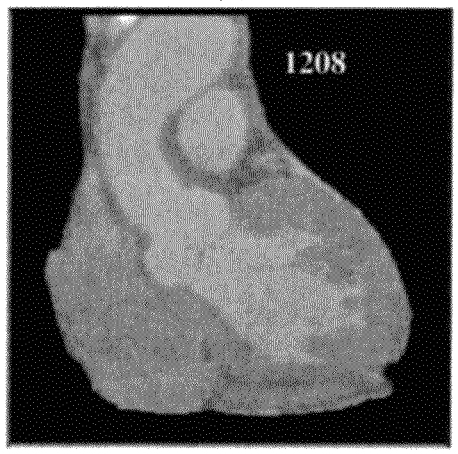
Figure 12B:
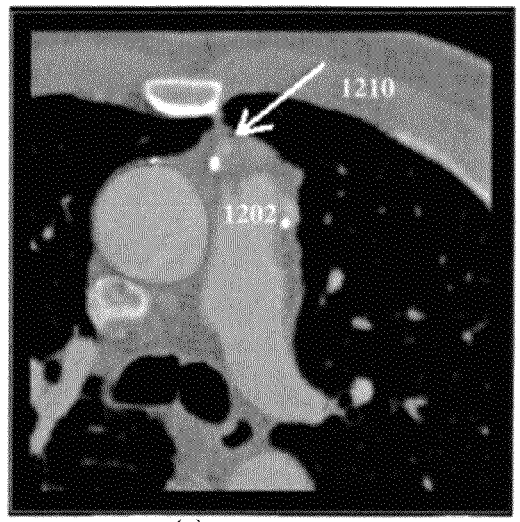
FIG. 12B illustrates transverse views of the heart isolation results illustrated in FIG. 12A.
Figure 12B:
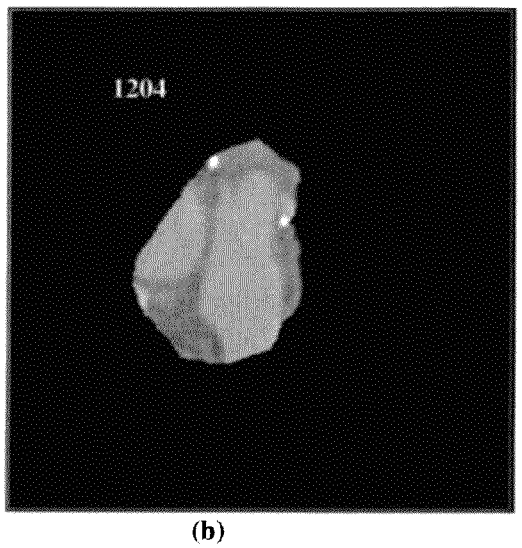
Figure 12B:
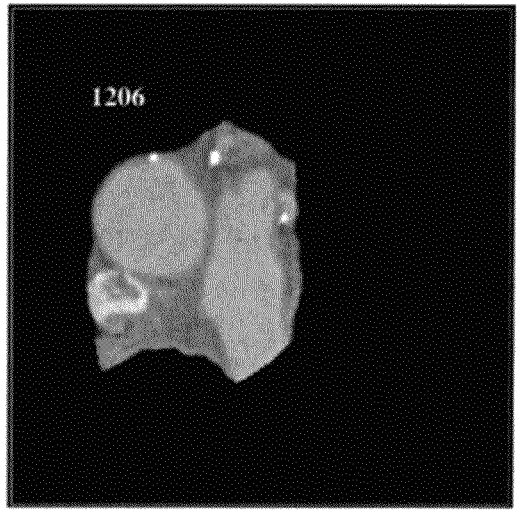
Figure 12B:
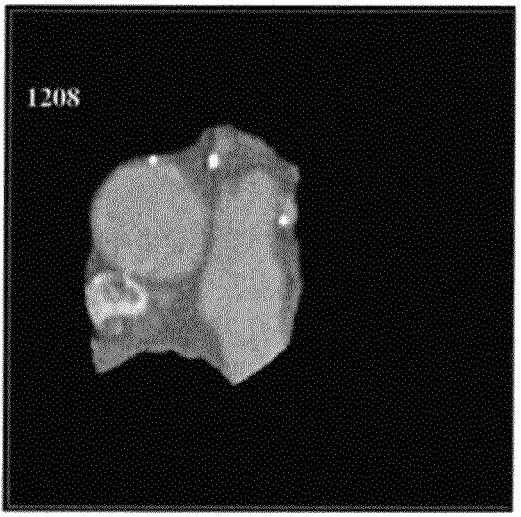

FIG. 12A illustrates exemplary heart isolation results for a bypass patient using the method of FIG. 2. FIG. 12B illustrates transverse views of the heart isolation results illustrated in FIG. 12A. Image (a) of FIGS. 12A and 12B each show the original volume with a segmented aorta mesh 1202. Image (b) of FIGS. 12A and 12B each show the initial heart isolation mask 1204. Image (c) of FIGS. 12A and 12B each show the expanded aorta mask 1206. Image (d) of FIGS. 12A and 12B each show the final expanded heart isolation mask 1208, which combines the initial heart isolation mask 1204 and the expanded aorta mask 1206. Image (a) of FIG. 12B also shows a bypass coronary artery 1210, which is partially cut by the initial heart isolation mask 1204. However, the coronary artery 1210 is successfully included in the expanded aorta mask 1206 and thus, is also successfully included in the final expanded heart isolation mask 1208.

Figure 13:
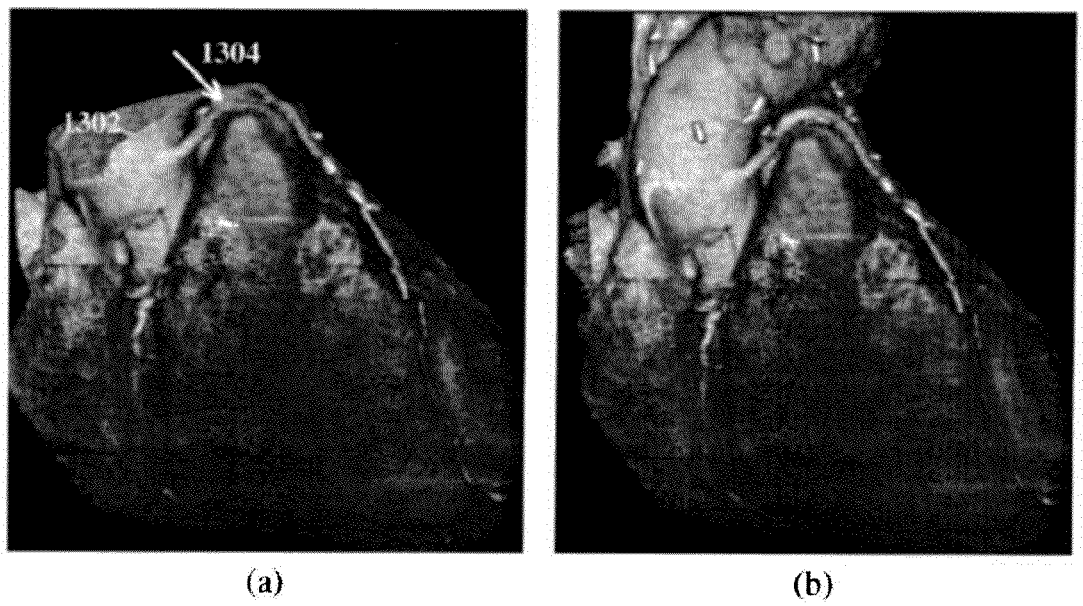
FIG. 13 illustrates exemplary heart isolation results for a patient with a saphenous vein grafted on the side of the ascending aorta as a bypass.

FIG. 13 illustrates exemplary heart isolation results for a patient with a saphenous vein grafted on the side of the ascending aorta as a bypass. Image (a) of FIG. 13 shows heart isolation results using the initial heart isolation mask and image (b) shows heart isolation results using the expanded heart isolation mask generated using the method of FIG. 2. Image (a) shows the graft ostium 1302 on the ascending aorta surface and the bypass coronary artery segment 1304 cut by the initial heart isolation mask. The bypass coronary artery is fully included in heart isolation results of image (b).

Figure 14:
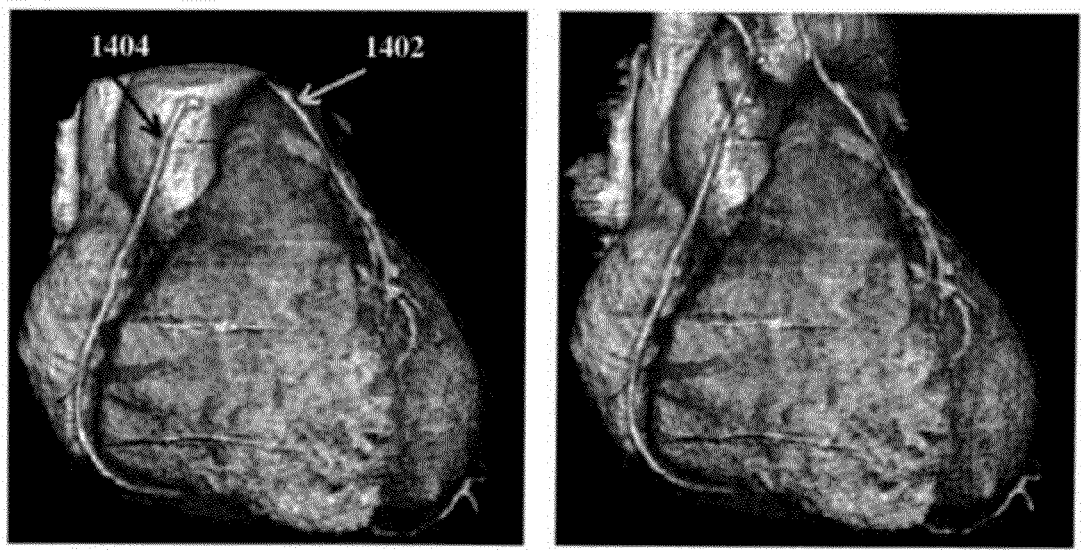
FIG. 14 illustrates exemplary heart isolation results for a patient with left and right internal thoracic artery bypasses.

FIG. 14 illustrates exemplary heart isolation results for a patient with left and right internal thoracic artery bypasses. Image (a) of FIG. 14 shows heart isolation results using the initial heart isolation mask and image (b) shows heart isolation results using the expanded heart isolation mask generated using the method of FIG. 2. Image (a) shows that the left internal thoracic artery bypass 1402 and the right internal thoracic artery bypass 1404 are cut by the initial heart isolation mask. The left and right internal thoracic artery bypasses are fully included in heart isolation results of image (b).

Figure 15:
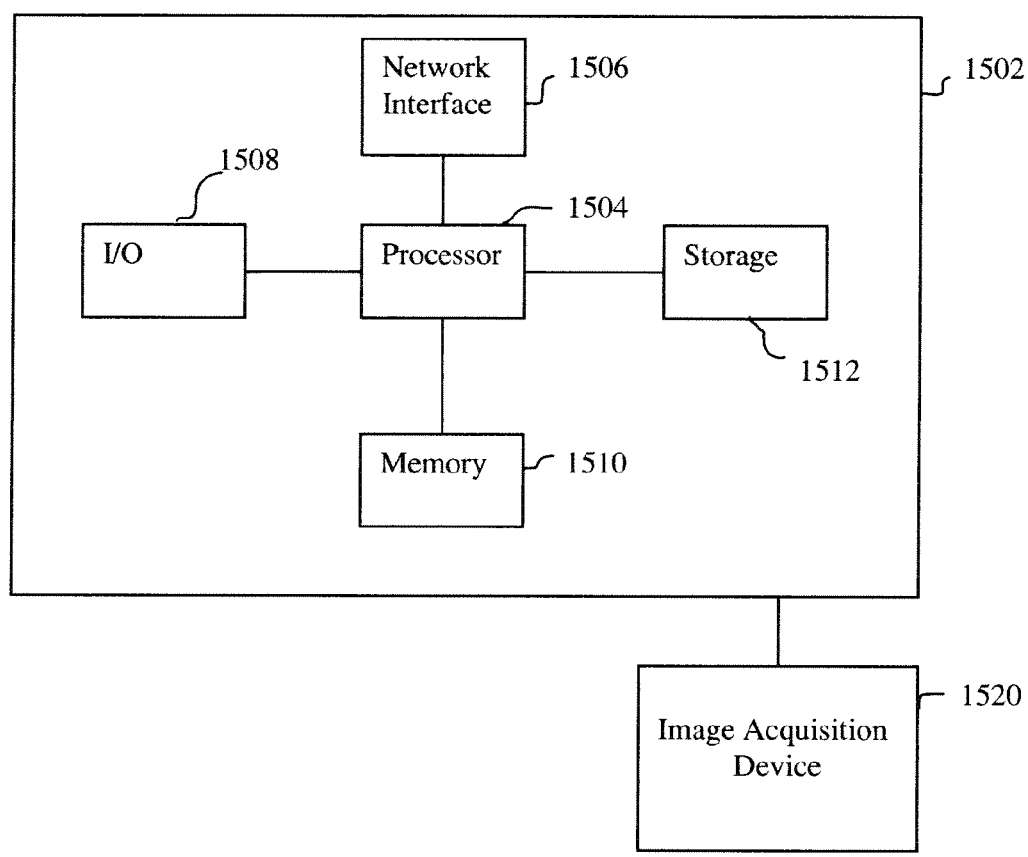
FIG. 15 is a high level block diagram of a computer capable of implementing the present invention.

The above-described methods for automatic heart isolation in a 3D volume, such as a CT volume, may be implemented on a computer using well-known computer processors, memory units, storage devices, computer software, and other components. A high level block diagram of such a computer is illustrated in FIG. 15. Computer 1502 contains a processor 1504 which controls the overall operation of the computer 1502 by executing computer program instructions which define such operation. The computer program instructions may be stored in a storage device 1512, or other computer readable medium (e.g., magnetic disk, CD ROM, etc.) and loaded into memory 1510 when execution of the computer program instructions is desired. Thus, the steps of the methods of FIGS. 2, 3, and 10 may be defined by the computer program instructions stored in the memory 1510 and/or storage 1512 and controlled by the processor 1504 executing the computer program instructions. An image acquisition device 1520, such as a CT scanner, can be connected to the computer 1502 to input images to the computer 1502. It is possible to implement the image acquisition device 1520 and the computer 1502 as one device. It is also possible that the image acquisition device 1520 and the computer 1502 communicate wirelessly through a network. The computer 1502 also includes one or more network interfaces 1506 for communicating with other devices via a network. The computer 1502 also includes other input/output devices 1508 that enable user interaction with the computer 1502 (e.g., display, keyboard, mouse, speakers, buttons, etc.). One skilled in the art will recognize that an implementation of an actual computer could contain other components as well, and that FIG. 15 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for isolating the heart in a 3D volume, comprising:
   extracting an initial heart isolation mask from the 3D volume;
   segmenting an aortic root and an ascending aorta in the 3D volume, resulting in an aorta mesh;
   expanding the aorta mesh to include bypass coronary arteries; and
   generating an expanded heart isolation mask by combining the initial heart isolation mask with an expanded aorta mask defined by the expanded aorta mesh,
   wherein the step of expanding the aorta mesh to include bypass coronary arteries comprises:

expanding the aorta mesh outwards until one of: the aorta mesh reaches a heart-lung boundary, and a maximum dilation is reached.

2. The method of claim 1, wherein the step of expanding the aorta mesh outwards until one of: the aorta mesh reaches a heart-lung boundary, and a maximum dilation is reached comprises:
expanding the aorta mesh outwards until the aorta mesh reaches the heart-lung boundary.

3. The method of claim 2, wherein the step of expanding the aorta mesh outwards until the aorta mesh reaches the heart-lung boundary comprises:
expanding the aorta mesh until an intensity at a mesh point in the 3D volume drops below a predetermined intensity threshold.

4. The method of claim 3, wherein the predetermined intensity threshold is −624 Hounsfield Unit (HU).

5. The method of claim 1, wherein the maximum dilation is 40 mm.

6. The method of claim 1, wherein the step of generating an expanded heart isolation mask by combining the initial heart isolation mask with an expanded aorta mask defined by the expanded aorta mesh comprises:
generating the expanded aorta mask as a binary volume where voxels within the expanded aorta mesh are set to 1 and other voxels are set to 0; and
combining the expanded aorta mask with the initial heart isolation mask.

7. The method of claim 1, wherein the step of segmenting an aortic root and an ascending aorta in the 3D volume comprises:
segmenting the aortic root in the 3D volume using marginal space learning (MSL);
tracking a centerline of the ascending aorta from the aortic root in the 3D volume; and
generating a tubular surface mesh based on the tracked centerline of the ascending aorta.

8. The method of claim 7, wherein the step of segmenting an aortic root and an ascending aorta in the 3D volume further comprises:
refining a boundary of the segmented ascending aorta surface mesh using trained boundary detector to adjust each point on the tubular surface mesh.

9. The method of claim 8, wherein the step of segmenting an aortic root and an ascending aorta in the 3D volume further comprises:
smoothing the refined boundary of the segmented ascending aorta surface mesh.

10. The method of claim 7, wherein the step of tracking a centerline of the ascending aorta from the aortic root in the 3D volume comprises:
detecting, on a slice by slice basis starting at the aortic root and moving upward in the 3D volume, an aortic circle representing an intersection of the ascending aorta and a current slice using a trained 2D circle detector.

11. The method of claim 8, wherein the step of segmenting the aortic root in the 3D volume using marginal space learning (MSL) comprises:
aligning an aortic root surface mesh to the 3D volume using MSL; and
adjusting a boundary of the aortic root surface mesh using a trained boundary detector.

12. The method of claim 1, wherein the step of extracting an initial heart isolation mask from the 3D volume comprises:
aligning a whole heart surface mesh to the 3D volume using marginal space learning (MSL);
splitting the whole heart surface mesh into four patches corresponding to the four chambers of the heart;
adjusting a boundary of each of the patches of the whole heart surface mesh using a separate trained boundary detector; and
generating the initial heart isolation mask from the adjusted boundary of the whole heart surface mesh.

13. The method of claim 12, wherein the step of extracting an initial heart isolation mask from the 3D volume further comprises:
post-processing the whole heart surface mesh the said adjusting step to remove non-heart components from within the adjusted boundary of the whole heart surface mesh.

14. The method of claim 13, wherein the step of post-processing the whole heart surface mesh the said adjusting step to remove non-heart components from within the adjusted boundary of the whole heart surface mesh comprises:
post-processing the whole heart surface mesh to remove portions of the descending aorta from within the adjusted boundary of the whole heart surface mesh.

15. The method of claim 13, wherein the step of post-processing the whole heart surface mesh the said adjusting step to remove non-heart components from within the adjusted boundary of the whole heart surface mesh comprises:
post-processing the whole heart surface mesh to remove portions of the descending aorta from within the adjusted boundary of the whole heart surface mesh.

16. The method of claim 1, further comprising:
generating a 3D visualization of the heart from the 3D volume using the expanded heart isolation mask.

17. An apparatus for isolating the heart in a 3D volume, comprising:
means for extracting an initial heart isolation mask from the 3D volume;
means for segmenting an aortic root and an ascending aorta in the 3D volume, resulting in an aorta mesh;
means for expanding the aorta mesh to include bypass coronary arteries; and
means for generating an expanded heart isolation mask by combining the initial heart isolation mask with an expanded aorta mask defined by the expanded aorta mesh,
wherein the means for expanding the aorta mesh to include bypass coronary arteries comprises:
means for expanding the aorta mesh outwards until one of: the aorta mesh reaches a heart-lung boundary, and a maximum dilation is reached.

18. The apparatus of claim 17, wherein the means for expanding the aorta mesh outwards until one of: the aorta mesh reaches a heart-lung boundary, and a maximum dilation is reached comprises:
means for expanding the aorta mesh outwards until the aorta mesh reaches the heart-lung boundary.

19. The apparatus of claim 18, wherein the means for expanding the aorta mesh outwards until the aorta mesh reaches the heart-lung boundary comprises:
means for expanding the aorta mesh until an intensity at a mesh point in the 3D volume drops below a predetermined intensity threshold.

20. The apparatus of claim 17, wherein the means for generating an expanded heart isolation mask by combining the initial heart isolation mask with an expanded aorta mask defined by the expanded aorta mesh comprises:

means for generating the expanded aorta mask as a binary volume where voxels within the expanded aorta mesh are set to 1 and other voxels are set to 0; and means for combining the expanded aorta mask with the initial heart isolation mask.

21. The apparatus of claim 17, wherein the means for segmenting an aortic root and an ascending aorta in the 3D volume comprises:

means for segmenting the aortic root in the 3D volume using marginal space learning (MSL);

means for tracking a centerline of the ascending aorta from the aortic root in the 3D volume; and means for generating a tubular surface mesh based on the tracked centerline of the ascending aorta.

22. The apparatus of claim 21, wherein the means for segmenting an aortic root and an ascending aorta in the 3D volume further comprises:

means for refining a boundary of the segmented ascending aorta surface mesh using trained boundary detector to adjust each point on the tubular surface mesh.

23. The apparatus of claim 22, wherein the means for segmenting an aortic root and an ascending aorta in the 3D volume further comprises:

means for smoothing the refined boundary of the segmented ascending aorta surface mesh.

24. The apparatus of claim 21, wherein the means for tracking a centerline of the ascending aorta from the aortic root in the 3D volume comprises:

means for detecting, on a slice by slice basis starting at the aortic root and moving upward in the 3D volume, an aortic circle representing an intersection of the ascending aorta and a current slice using a trained 2D circle detector.

25. The apparatus of claim 17, wherein the means for extracting an initial heart isolation mask from the 3D volume comprises:

means for aligning a whole heart surface mesh to the 3D volume using marginal space learning (MSL);

means for splitting the whole heart surface mesh into four patches corresponding to the four chambers of the heart;

means for adjusting a boundary of each of the patches of the whole heart surface mesh using a separate trained boundary detector; and means for generating the initial heart isolation mask from the adjusted boundary of the whole heart surface mesh.

26. The apparatus of claim 25, wherein the means for extracting an initial heart isolation mask from the 3D volume further comprises:

means for post-processing the whole heart surface mesh the said adjusting step to remove non-heart components from within the adjusted boundary of the whole heart surface mesh.

27. A non-transitory computer readable medium encoded with computer executable instructions for isolating the heart in a 3D volume, the computer executable instructions defining steps comprising:

extracting an initial heart isolation mask from the 3D volume;

segmenting an aortic root and an ascending aorta in the 3D volume, resulting in an aorta mesh;

expanding the aorta mesh to include bypass coronary arteries; and generating an expanded heart isolation mask by combining the initial heart isolation mask with an expanded aorta mask defined by the expanded aorta mesh, wherein the computer executable instructions defining the step of expanding the aorta mesh to include bypass coronary arteries comprise computer executable instructions defining the step of:

expanding the aorta mesh outwards until one of: the aorta mesh reaches a heart-lung boundary, and a maximum dilation is reached.

28. The non-transitory computer readable medium of claim 27, wherein the computer executable instructions defining the step of expanding the aorta mesh outwards until one of: the aorta mesh reaches a heart-lung boundary, and a maximum dilation is reached comprise computer executable instructions defining the step of:

expanding the aorta mesh outwards until the aorta mesh reaches the heart-lung boundary.

29. The non-transitory computer readable medium of claim 28, wherein the computer executable instructions defining the step of expanding the aorta mesh outwards until the aorta mesh reaches the heart-lung boundary comprise computer executable instructions defining the step of:

expanding the aorta mesh until an intensity at a mesh point in the 3D volume drops below a predetermined intensity threshold.

30. The non-transitory computer readable medium of claim 27, wherein the computer executable instructions defining the step of generating an expanded heart isolation mask by combining the initial heart isolation mask with an expanded aorta mask defined by the expanded aorta mesh comprise computer executable instructions defining the steps of:

generating the expanded aorta mask as a binary volume where voxels within the expanded aorta mesh are set to 1 and other voxels are set to 0; and combining the expanded aorta mask with the initial heart isolation mask.

31. The non-transitory computer readable medium of claim 27, wherein the computer executable instructions defining the step of segmenting an aortic root and an ascending aorta in the 3D volume comprise computer executable instructions defining the steps of:

segmenting the aortic root in the 3D volume using marginal space learning (MSL);

tracking a centerline of the ascending aorta from the aortic root in the 3D volume; and generating a tubular surface mesh based on the tracked centerline of the ascending aorta.

32. The non-transitory computer readable medium of claim 31, wherein the computer executable instructions defining the step of segmenting an aortic root and an ascending aorta in the 3D volume further comprise computer executable instructions defining the step of:

refining a boundary of the segmented ascending aorta surface mesh using trained boundary detector to adjust each point on the tubular surface mesh.

33. The non-transitory computer readable medium of claim 32, wherein the computer executable instructions defining the step of segmenting an aortic root and an ascending aorta in the 3D volume further comprise computer executable instructions defining the step of:

smoothing the refined boundary of the segmented ascending aorta surface mesh.

34. The non-transitory computer readable medium of claim 31, wherein the computer executable instructions defining the step of tracking a centerline of the ascending aorta from the aortic root in the 3D volume comprise computer executable instructions defining the step of:

detecting, on a slice by slice basis starting at the aortic root and moving upward in the 3D volume, an aortic circle representing an intersection of the ascending aorta and a current slice using a trained 2D circle detector.

35. The non-transitory computer readable medium of claim 27, wherein the computer executable instructions defining the step of extracting an initial heart isolation mask from the 3D volume comprise computer executable instructions defining the steps of:
- aligning a whole heart surface mesh to the 3D volume using marginal space learning (MSL);
- splitting the whole heart surface mesh into four patches corresponding to the four chambers of the heart;
- adjusting a boundary of each of the patches of the whole heart surface mesh using a separate trained boundary detector; and
- generating the initial heart isolation mask from the adjusted boundary of the whole heart surface mesh.

36. The non-transitory computer readable medium of claim 35, wherein the computer executable instructions defining the computer executable instructions defining the step of extracting an initial heart isolation mask from the 3D volume further comprise computer executable instructions defining the step of:
- post-processing the whole heart surface mesh the said adjusting step to remove non-heart components from within the adjusted boundary of the whole heart surface mesh.

* * * * *